June 27, 1933. D. P. CARTWRIGHT 1,916,038
FREEZING PREVENTING MEANS FOR LIQUID CONTAINERS
Filed May 22, 1931 2 Sheets-Sheet 2
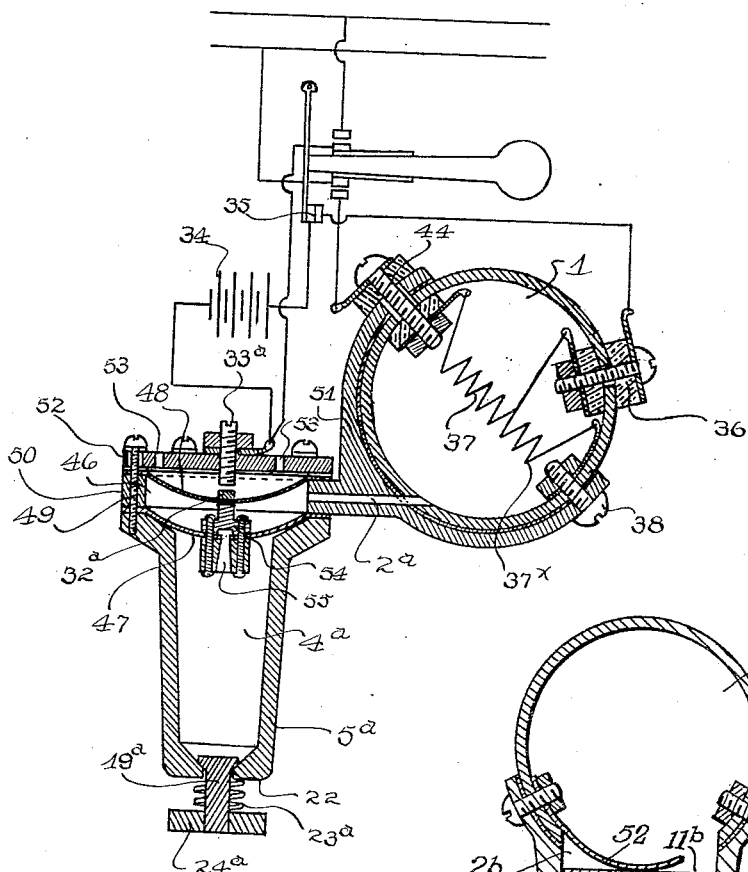
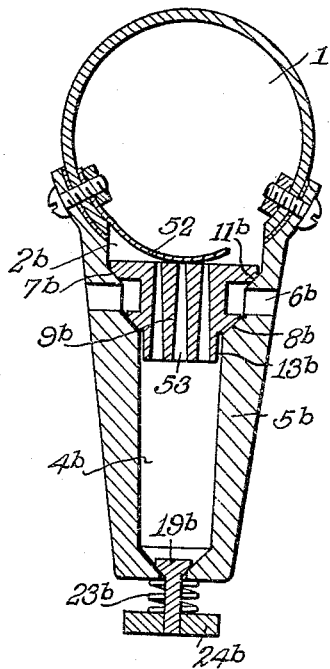
INVENTOR
Dale P. Cartwright
BY
his ATTORNEY Patented June 27, 1933

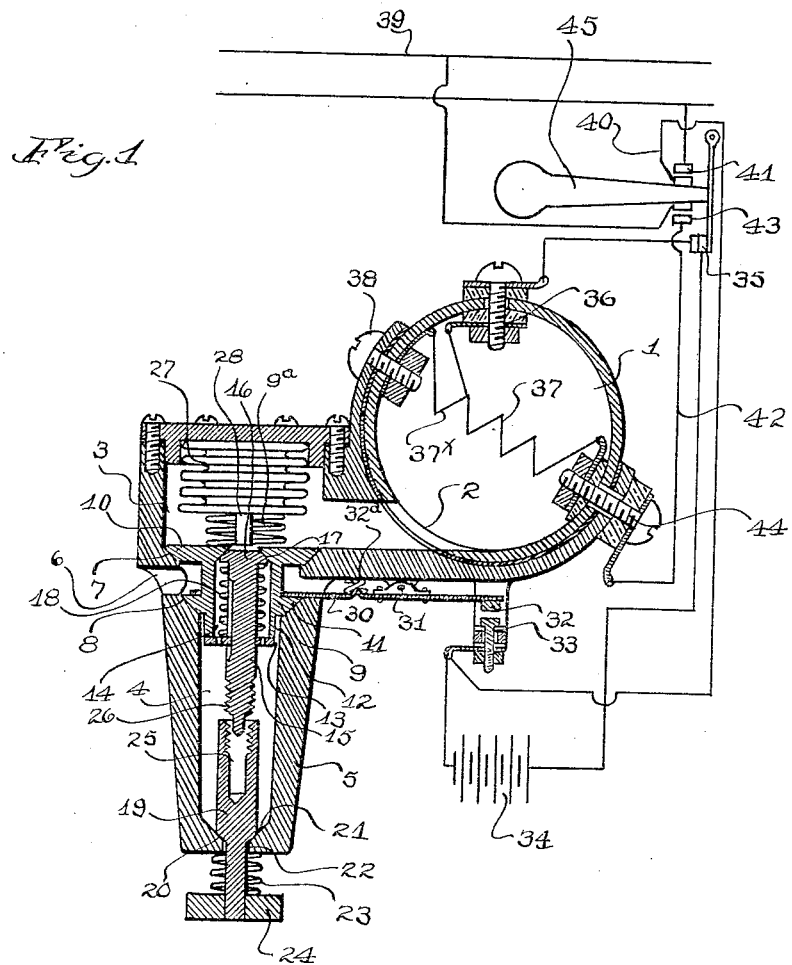

1,916,038

UNITED STATES PATENT OFFICE

DALE P. CARTWRIGHT, OF ROCHESTER, NEW YORK

FREEZING PREVENTING MEANS FOR LIQUID CONTAINERS

Application filed May 22, 1931. Serial No. 539,229.

The present invention relates to freezing preventing or protecting means for liquid containers and an object thereof is to provide a freezing chamber which controls the protecting means such as a heating means or a draining means and which can be filled at will with liquid from the liquid containers so as to have the characteristics of such liquid at any time. Another object of the invention is to construct the freezing device so that it is subject substantially to the temperature of the surrounding atmosphere so as to be sensitive to atmospheric conditions. Still another object of the invention is to provide a freezing device which has a flaring freezing chamber so that a movable body which controls a protecting device may be arranged at the wider end of the chamber to be moved by the frozen liquid in the chamber. A further object of this invention is to provide a novel control for a heating device which will automatically heat the liquid in the liquid container when there is a tendency for said liquid to freeze. A still further object of the invention is to provide a novel means of heating the liquid of a cooling system from the usual electric line wires.

To these and other ends, the invention consists of certain parts and combinations of parts, and all of which will be hereinafter described: the novel features being pointed out in the appended claims.

In the drawings:

Fig. 1 is a vertical section through one embodiment of the invention;

Fig. 2 is a vertical section through another embodiment; and

Fig. 3 is a vertical section through still another embodiment.

In the embodiment of the invention illustrated in Fig. 1, 1 indicates the pipe of a cooling system of a motor said pipe having a discharge opening 2 at one side to which a liquid collecting or freezing device is connected. In this instance, this liquid collecting device or freezing device comprises a casting secured to the pipe 1 at the discharge opening 2 and formed with an upper chamber 3 communicating with a downwardly tapering chamber 4 in a depending portion 5 of the casting. Between the two chambers are arranged outlets 6 by which the cooling system of the motor may be drained. Above the outlets 6 a seat 7 is provided and below said outlet a seat 8 is provided. A valve body 9 has two seats 10 and 11, one normally held in engagement with the valve seat 7 and the other normally held in engagement with the valve seat 8 by a spring 9ª. The valve body has an extension 12 below its seat 11 extending into the chamber 4 and spaced slightly from the walls of said chamber to provide an annular sealing space 13 about the extension, and to also provide a reseating guide for the valve.

The chamber 4 forms a freezing chamber in which liquid from the cooling chamber is collected, and as such chamber is surrounded by the outside atmosphere at its top, bottom and sides, the liquid therein readily freezes. The freezing first occurs about the extension 12 and seals temporarily the valve member in its closed position. As the liquid in the chamber freezes still more it expands upwardly due to the upward flare of the chamber 4, thus unsealing the seat 10 from the valve seat 7 and permitting the liquid from the cooling system to flow through the outlets 6 and drain the system before freezing in the main part of the system takes place.

The freezing chamber 4 should be filled with a liquid having all of the characteristics of the liquid in the cooling system so that it only freezes when there are possibilities of the liquid in the cooling system freezing. To this end, means is provided for filling the chamber 4 with the liquid of the cooling chamber. In this instance, the valve body 9 has a passage 14 connecting the chamber 3 with the chamber 4 and through which extends a valve body 15 having at its upper end a valve head 16 for engaging a valve seat 17 at the upper end of the passage 14. A spring 18 in the passage normally holds the valve head 16 to the seat 17. Depression of the valve body 15 opens communication between the freezing chamber 4 and the cooling system. This may be effected by a valve body 19 having a seat 20 arranged to engage a valve seat 21 about an opening 22. Normally the valve body 19 is held to the seat 21 by a spring 23. Pressure upwardly on the handle 24 of the valve body 19 opens the lower end of the chamber 4 and permits the draining of the latter. The valve body 19 has an internally threaded socket 25 adapted to engage a screw threaded stem 26 on the valve body 15 so as to draw the latter downwardly and open the passageway from the cooling system to the freezing chamber 4. After the latter is filled with a liquid having the characteristics of the liquid in the freezing chamber 4, then the valve body 15 is released to cut off the flow to the chamber 4. Opening of the passage 14 may also be effected by a thermostat 27 arranged in the chamber 3 and having a stem 28 adapted to engage the valve body 15 and depress the same. This occurs whenever the engine cooling liquid is heated.

In connection with the freezing device, there may be employed a means which heats the liquid in the cooling system whenever freezing takes place in the freezing chamber. This is effected, in this instance, from an electric switch operated by a movable part on the freezing chamber when the liquid therein freezes. In this instance, the movable part is the valve body 9 which has an end of a lever 30 disposed above a portion of the body 9, said lever being pivoted at 31 and carrying at its free end a contact 32 which normally is held by a spring $32^a$ out of engagement with insulated contact 33 of a circuit which includes a battery 34 and a switch 35 which leads to an intermediate terminal 36 of a resistance or heating coil $37^x$. Another terminal 38 connects the heating coil $37^x$ with the casting in which the freezing chamber is formed, thus completing the circuit. The purpose of the two coils 37 and $37^x$ is to provide a low resistance for a battery current and a high resistance for a line wire current of greater voltage. When the frozen material in the chamber 4 expands, the lever 30 closes the battery circuit and heats the low resistance coil $37^x$, thus preventing the liquid in the cooling system from freezing. Both the heating coils being in series, they may also be used for maintaining the liquid in the cooling system in a warm condition when the temperature of the atmosphere is equal to the freezing point of the liquid from the usual electric line wires 39, one of which connects by a conductor 40 and a switch 41 with the contact 33 while the other of which connects by a conductor 42 and a switch 43 with the coil terminal 44. The two switches 41 and 43 are arranged in proximity so that a common insulated plug 45 may effect their simultaneous closure. The switch 35 is also arranged adjacent this plug 45 so that the latter will, when closing switches 41 and 43 effect the opening of the switch 35 to break the battery circuit.

In the embodiment of the invention shown in Fig. 2, the pipe 1 of the cooling system has a small passage $2^a$ which connects with the chamber 46 between two diaphragms 47 and 48 mounted at the top of a freezing chamber $4^a$ which flares upwardly and has its bottom and sides exposed to the outside temperature conditions, being formed in a depending portion $5^a$ which by bolts 49 secure it to a ring 50 formed on a casting 51 in which the passage $2^a$ is formed. The bolts 49 also secure a cap plate 52 to but insulated from the upper face of the ring 50, said cap plate having vent openings 53 to the atmosphere above the diaphragm 48. Diaphragm 47 is also supported by the bolts in a position below the ring 50. The bottom of the freezing chamber $4^a$ has an opening 22 which is normally closed by a valve member $19^a$ pressed to closed position by a spring $23^a$ and having a hand piece $24^a$. The two diaphragms are connected by a body 54 which has a port 55 leading from the chamber 46 between the diaphragms to the freezing chamber $4^a$. In this way the liquid will flow from the cooling system to fill the freezing chamber $4^a$ which may be emptied at any time and refilled to collect liquid which will have the characteristics of the liquid in the cooling system. The diaphragms form movable means which in this instance, controls a heating device for heating the water in the cooling system.

The heating means, in this embodiment, comprises electrical resistance coils 37 and $37^x$ having a terminal 38 grounded by the casting 51 and a terminal 36 connected by a switch 35 with a battery 34, the latter being connected to a fixed contact $33^a$ of a switch whose movable element $32^a$ is connected to the movable diaphragms. The heating means of this embodiment may be connected to the usual line wires so as to cut out the battery and heat the cooling liquid from the line wires as shown and described with reference to the embodiment shown in Fig. 1.

In the embodiment shown in Fig. 3, a pipe 1 of the cooling system has a large opening $2^b$ in its bottom closed by a casting having a depending portion $5^b$ provided with a freezing chamber $4^b$ formed with a discharge at its bottom normally closed by a valve body $19^b$ held to its seat by a spring $23^b$ and movable away from its seat by a finger piece $24^b$. The freezing chamber $4^b$ flares toward its top where it is closed by a valve seat $8^b$ and a valve body $9^b$ engaging the seat $8^b$. The casting $5^b$ has a draining means $6^b$ and above the draining means on the casting is arranged a seat $7^b$ with which is adapted to engage a seat $11^b$ on the valve body $9^b$. A spring 52 serves to hold the valve body $9^b$ to its seats. The valve body $9^b$ has a plurality of vertical bores 53 which taper toward their upper end and which conduct the liquid from the cooling system to the freezing device. The valve 19b is opened to clear the freezing device of the liquid so that liquid having the characteristics of the liquid of the cooling system may be conducted to the freezing device by the bores 53. As the bores are smaller at their tops than at their bottoms, there is a tendency for the bores to freeze first at their tops. The depending extension on the valve body forms a reseating guide for the valve and a small annular sealing space 13b where the liquid will freeze more quickly and close the freezing chamber at its top. In this construction, the freezing of the liquid in the chamber 4b tends to force the valve body 9b upwardly and permit the liquid to flow from the cooling system through the draining means 6b before freezing in the cooling system.

In all embodiments of the invention the freezing chamber of the freezing device has a manually controlled draining valve at its bottom and flares upwardly. Its bottom and side walls are entirely exposed to the atmospheric conditions while the top of the freezing chamber has movable means which is subject to movement under action of a liquid freezing in the freezing chamber, so as to control a protecting device for the liquid containing system, two forms of such protecting devices being shown, one a heating means for the liquid containing system and the other a draining means. The movable means which controls the protecting device in all embodiments is provided with a passageway which connects the liquid containing system with the freezing chamber so that liquid from the liquid containing device may flow to the freezing chamber through said movable member. In two of the illustrated embodiments of the invention, the movable member is in the form of a valve body and closes the upper end of the freezing chamber as well as a draining means which is arranged between the freezing chamber and the liquid containing system so that the movement of the valve body under a freezing action in the freezing chamber opens the draining means and drains the liquid containing system to be drained. This valve body has a reduced extension into the freezing chamber serving both as the guide for the valve member in directing the latter to its seats and also serving to provide an annular sealing space in which the liquid will freeze before the main body of the liquid in the freezing chamber. In the other embodiment of the invention instead of a valve member controlling a draining means the movable member is in the form of two connected diaphragms moved under the action of the liquid freezing in the freezing chamber and controlling a protecting device for the liquid containing system.

In the embodiment shown in Fig. 1 two protecting means are employed, a draining means and a heating means both controlled by the member movable under the freezing action in the freezing device. Whereas, in Fig. 2 the protecting device is in the form of a heating means in the liquid containing system, and, in Fig. 3, the protecting means is in the form of a draining means. The embodiment shown in Figs. 1 and 2 have each means associated therewith which will make it possible to keep the liquid containing system warm from the ordinary line wires as well as from a battery wherever there is a tendency for the liquid to freeze.

What I claim as my invention and desire to secure by Letters Patent is:

1. The combination with a liquid containing system to be protected against freezing, of a freezing chamber having communication with the liquid containing system to be filled therefrom, a valve for draining the freezing chamber, a member movable by a liquid frozen in the freezing chamber, and a protecting means against freezing for the liquid containing system controlled by said member.

2. The combination with a liquid containing system to be protected against freezing, of a freezing chamber, a member movable by liquid frozen in the freezing chamber and having a passage leading therethrough to connect the liquid containing system with the freezing chamber, and a protecting means against freezing for the liquid containing system controlled by said member.

3. The combination with a liquid containing system to be protected against freezing, of a freezing chamber flaring from its bottom upwardly, a drain valve at the bottom of the chamber, a movable member at the top of the chamber adapted to be moved by the liquid frozen in the freezing chamber and having communication extending therethrough from the liquid containing system to the freezing chamber, and a protecting means against freezing for the liquid containing system controlled by said member.

4. The combination with a liquid containing system to be protected against freezing, of a freezing chamber, a drain means interposed between the freezing chamber and the liquid containing system, and a movable member for closing the drain means having a passage providing communication between the system and the freezing chamber and exposed to the contents of the freezing chamber so that when said contents freeze the member will be moved to open the drain means.

5. The combination with a liquid containing system to be protected against freezing, of a freezing chamber opening to the system, drain means for the system arranged between the freezing chamber and the system, and a valve body normally closing the drain means and also closing said chamber to the exterior and movable by frozen liquid in the freezing chamber to open the drain means.

6. The combination with a liquid containing system to be protected against freezing, of a freezing chamber opening to the system, drain means for the system arranged between the freezing chamber and the system, and a valve body normally closing the drain means and also closing said chamber to the exterior and movable by frozen liquid in the freezing chamber to open the drain means, said valve body having an extension into the freezing chamber forming a sealing space about the extension.

7. The combination with a liquid containing system to be protected against freezing, of a freezing chamber opening to the system, drain means for the system arranged between the freezing chamber and the system, and a valve body normally closing the drain means and also closing said chamber to the exterior and movable by frozen liquid in the freezing chamber to open the drain means, said valve body having a guide extension into the freezing chamber.

8. The combination with a liquid containing system to be protected against freezing, of a freezing chamber open at one end, drain means interposed between the liquid containing system and the chamber, two valve seats on opposite sides of the drain means, one at the open end of the freezing chamber, and a valve body having two seats cooperating with the valve seats on the opposite sides of the drain means, said valve body normally closing the freezing chamber and the drain means to the liquid containing system.

9. The combination with a liquid containing system to be protected against freezing, of heating means for heating the liquid of the system, and a freezing device for controlling said heating means.

10. The combination with a liquid containing system to be protected against freezing, of primary heating means for the liquid in said system, a freezing device controlling said heating means, means through which the heating device may be heated from a secondary source, and means for rendering the control of the primary heating means by the freezing device ineffective when the secondary heating means is operative.

11. The combination with a liquid containing system to be protected against freezing, of heating means for said system including an electrical circuit, a liquid holding device susceptible to freezing, and means movable by the freezing of the liquid in said device for controlling the said circuit.

12. The combination with a liquid containing system to be protected against freezing, of a freezing chamber having a restricted normally closed controllable communication with the liquid containing system to receive liquid therefrom, and direct protecting means against freezing for the liquid containing system including an operating member movable by liquid frozen in the freezing chamber.

13. The combination with a liquid containing system to be protected against freezing, of a freezing chamber having restricted normally closed controllable communication with the liquid containing system to receive liquid therefrom and provided with a flaring chamber, and direct protecting means against freezing for the liquid containing system including an operating member at the widest end of the chamber movable by liquid frozen in the freezing chamber.

14. The combination with a liquid containing system to be protected against freezing, of a body provided with a freezing chamber having normally closed controllable communication with the liquid containing system, the walls, bottom and top of said chamber being exposed to the atmosphere, and direct protecting means against freezing for the liquid containing system including an operating member movable by liquid frozen in the freezing chamber.

15. The combination with a liquid containing system to be protected against freezing, of a freezing chamber, manually operable valve means controlling communication between the liquid containing system and the freezing chamber, and protecting means against freezing for the liquid containing system including an operating member actuated by liquid frozen in the freezing chamber.

16. The combination with a liquid containing system to be protected against freezing, of a freezing chamber, valve means controlling communication between the chamber and the liquid containing system, means subject to the temperature of the liquid in the liquid containing system for controlling said valve means, and means for protecting the liquid within the liquid containing system against freezing controlled by the freezing liquid in the freezing chamber.

DALE P. CARTWRIGHT.